W. E. F. GIBSON.
AUTOMOBILE SIGNAL.
APPLICATION FILED AUG. 12, 1916.
1,292,304.
Patented Jan. 21, 1919.
2 SHEETS—SHEET 1.
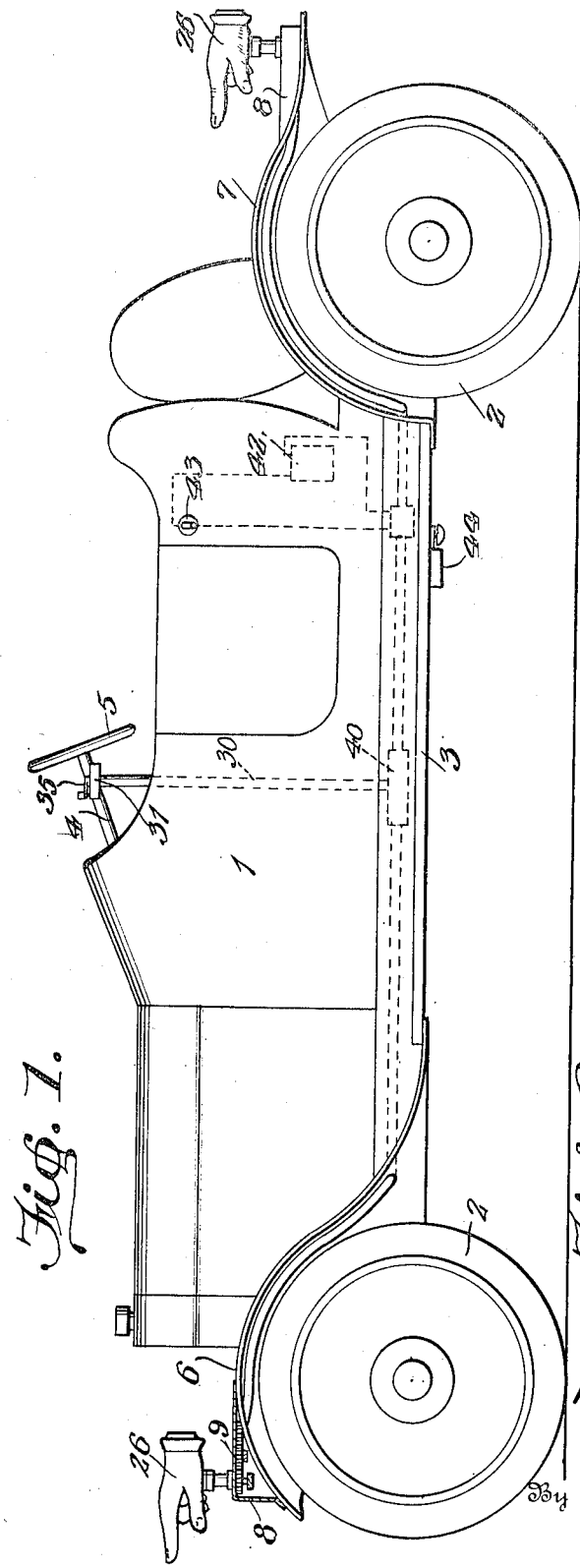
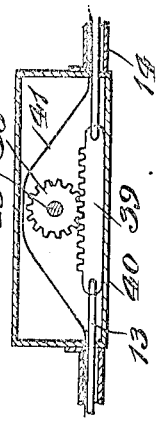
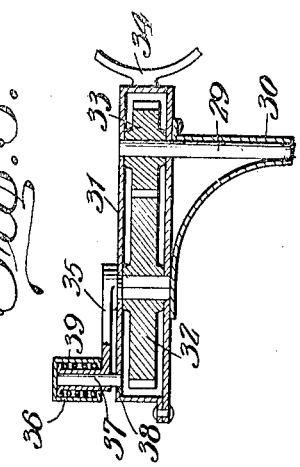
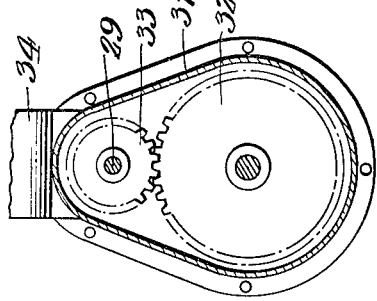
William E. F. Gibson,
Inventor
By Geo. P. Kimmel.
Attorney W. E. F. GIBSON.
AUTOMOBILE SIGNAL.
APPLICATION FILED AUG. 12, 1916.
1,292,304.
Patented Jan. 21, 1919.
2 SHEETS—SHEET 2.
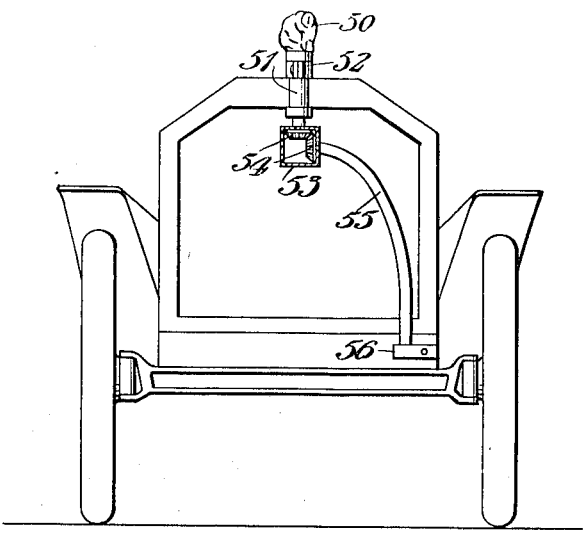
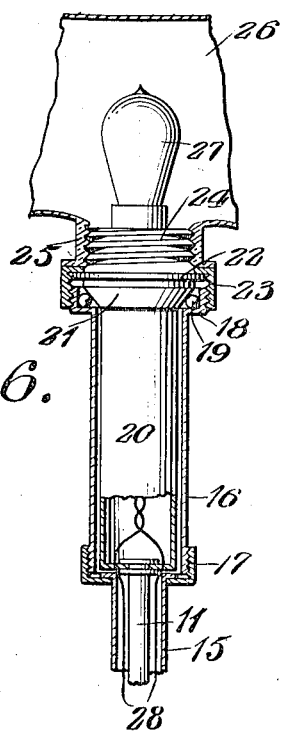
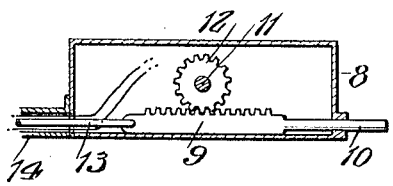
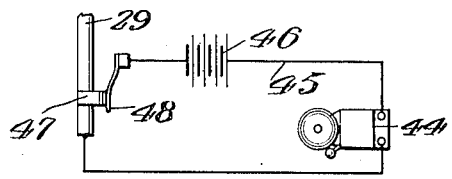
William E. F. Gibson,
Inventor
By Geo. P. Kimmel.
Attorney

UNITED STATES PATENT OFFICE.

WILLIAM E. F. GIBSON, OF SEATTLE, WASHINGTON.

AUTOMOBILE-SIGNAL.

1,292,304.  Specification of Letters Patent.  Patented Jan. 21, 1919.

Application filed August 12, 1916.  Serial No. 114,566.

*To all whom it may concern:*

Be it known that I, WILLIAM E. F. GIBSON, a citizen of the United States, and resident of Seattle, in the county of King and State of Washington, have invented certain new and useful Improvements in Automobile-Signals, of which the following is a specification.

The present invention relates to signaling devices and has particular reference to new and useful improvements in automobile direction indicators and the like.

My invention has as its primary object the provision of a new and improved type of signaling device for use in connection with automobiles and the like, the device being adapted to be mounted on the forward and rear end portions of an automobile or similar vehicle to indicate to pedestrians and other vehicle drivers the direction which the driver of the signaling vehicle intends to take.

Another object of my invention is to provide a device of the character described having alarm means associated therewith whereby to automatically apprise persons of the approach of the vehicle and to direct the attention of pedestrians and others to the signaling device.

A further object of my invention is to provide a device of the character described which may be operated from the driver's seat and which will indicate at night or in the day time.

A still further object of my invention is to provide a signaling device which may be quickly and easily installed on any of the existing types of motor vehicles without altering the structure of the motor vehicle or detracting from the appearance of the car.

Other objects and advantages to be derived from the use of my improved automobile signal will appear from the following detail description and the claims, taken with an inspection of the accompanying drawings, in which:

Figure 1 is a side elevational view of an automobile showing my improved signaling system installed;

Fig. 2 is an enlarged horizontal sectional view of the control mechanism;

Fig. 3 is a longitudinal vertical sectional view of the same;

Fig. 4 is an enlarged longitudinal sectional view of motion transmitting means for association with the control mechanism;

Fig. 5 is a front end elevational view of a motor vehicle showing the modified form of my invention;

Fig. 6 is an enlarged fragmentary sectional view of one of the visual signals;

Fig. 7 is an enlarged longitudinal sectional view of motion transmitting means for association with the visual signal; and Fig. 8 is a diagrammatic view of an audible electric alarm circuit operable in conjunction with the visual signal.

Referring more particularly to the drawings, wherein similar characters of reference designate like and corresponding parts throughout the various views, 1 designates the body of the usual motor vehicle, the same being mounted on wheels 2 and having the usual running-board 3. A steering post is designated 4 and is provided with the usual steering wheel 5.

The signaling device of my invention is adapted to be installed on the forward and rearward mud-guards designated in the present instance 6 and 7, respectively.

The signaling device proper consists of a housing 8 having a rack-bar 9 slidably mounted therein, said rack-bar having a guide rod 10 extending therefrom through one end wall of said housing. A vertical shaft 11 is arranged in said housing and is provided with a pinion 12 meshing with said rack-bar. A flexible motion transmitting member 13 connects with the free end of the rack-bar 9 and extends through a conduit 14, said conduit 14 being arranged beneath and along the running-board 3. The shaft 11 may be extended to any length, the same being rotatably arranged in a vertical tubing 15, which latter extends from the top wall of the housing 8. A tubular enlargement 16 is carried by the upper end of the tube 15 and associated therewith by means of a threaded connection 17. The upper free end of the tubular enlargement 16 is offset to provide an annular channel 18 for reception of balls 19. The shaft 11 carries a drum 20 on its upper end, said drum having a flaring portion 21 engageable with the balls 19. The upper free end of the drum 20 is provided with a laterally extending annular flange 22, a threaded flanged ring 23 engageable with the channel 18 serving to retain the drum on its ball bearings. The drum 20 is also provided with a threaded portion 24 to receive the threaded throat 25 of a semi-transparent indicating hand 26, an electric lamp 27 being carried by said drum 20, conductors 28 supplying current to said lamp.

In order to give motion to the flexible motion transmitting member 13, I provide a shaft 29 vertically arranged in a housing 30 extending from the steering post 4 to a point adjacent the running-board 3. A casing 31 is carried by the upper free end of the housing 30, said casing containing a relatively large gear 32, a pinion 33 in meshing engagement therewith, and a clamp 34 for engagement with the steering post 4. A pinion 33 is carried by the upper free end of the shaft 29 and a crank 35 connects with the gear 32 to impart movement thereto. The crank 35 is provided with a handle 36, said handle carrying a rod 37 engageable in one of a plurality of openings 38 formed in the top wall of the casing 31. A spring 39 arranged in the handle 36 serves to maintain the rod 37 in engagement with one of the openings 38 when said handle is moved.

Means is provided for transmitting motion from the shaft 29 to the motion transmitting member 13, said means including a pinion 38 carried by the lower end of said shaft 29 and meshing with a rack bar 39, said rack-bar being interposed in the flexible motion transmitting member 13 as best shown in Fig. 4. The rack-bar and pinion are mounted in the housing 40, the conduit 14 communicating therewith. Electrical conductors 41 are arranged in the conduit 14, said conductors 41 extending to the forward and rear ends of an automobile and connecting with the conductors 28 of the signaling devices. Current is supplied to the conductors by any suitable means such as the lighting system of the automobile or the battery 42 and switch 43 best shown in Fig. 1.

I provide an audible signal for warning pedestrians of the approach of the vehicle and for directing attention to the visual signal, said audible signal including an electric bell 44 interposed in a conductor 45 having a battery 46 or other suitable source of energy associated therewith. A lug 47 carried by the shaft 29 is adapted to engage a spring arm 48 to close the circuit controlling said bell. It will be seen that when the indicating hands 26 are swung to indicate a direction of travel the lug 47 will engage the spring arm 48 closing the circuit to the bell.

In the preferred form of my invention a hand is placed on each mud-guard and the forward and rear end portions of an automobile or the like. In the modified form of my invention shown in Fig. 5 I provide an indicating hand 50 carried by the upper end portion of a tubular extension 51 clamped to the forward end of the radiator by means of a bracket 52. A gear housing 53 is provided in which are mounted a pair of beveled gears 54. A conduit 55 carries a flexible motion transmitting member, said motion transmitting member communicating with a housing 56 containing gearing similar to that shown in Fig. 7. The operation of this part of my invention is practically identical with the preferred form. Electric current is supplied to the lamp in the hand 50 by conductors similar to the conductors 28 hereinbefore referred to.

By various modifications of the device it may be adapted for application to various types of vehicles, and it will be seen that by supplying additional gearing the indicating hands may be placed in any positions which may be desired. It will also be seen that without altering the structural arrangement of an automobile my improved indicator may be applied thereto without the use of expert labor.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

A direction indicator including casings supported on the opposite extremities of a vehicle, rotatable shafts on said casings, signals carried by said shafts, pinions mounted on the lower end of the shafts, racks slidable in said casings engaged with said pinions, flexible connections engaged about their opposite ends with the racks, a rack engaged with the adjacent end of said connection, a shaft mounted in the vehicle extending upwardly to a point adjacent the steering gear thereof, a pinion mounted on the lower end of the shaft meshing with second mentioned rack, a casing arranged on the steering gear of the vehicle receiving the upper ends of the shaft therein, interconnected gears having connection with said shaft, and an interchangeably locked control handle engaged with one of said gears and movable over said last mentioned casing.

In testimony whereof, I affix my signature hereto.

WILLIAM E. F. GIBSON.